Jan. 20, 1970  P. G. JOYNER  3,490,382
GEARING AND LUBRICATING MEANS THEREFOR
Filed Aug. 9, 1968  5 Sheets-Sheet 1

INVENTOR
PHILIP GEORGE JOYNER
BY
Christensen, Sanborn & Matthews
ATTORNEYS

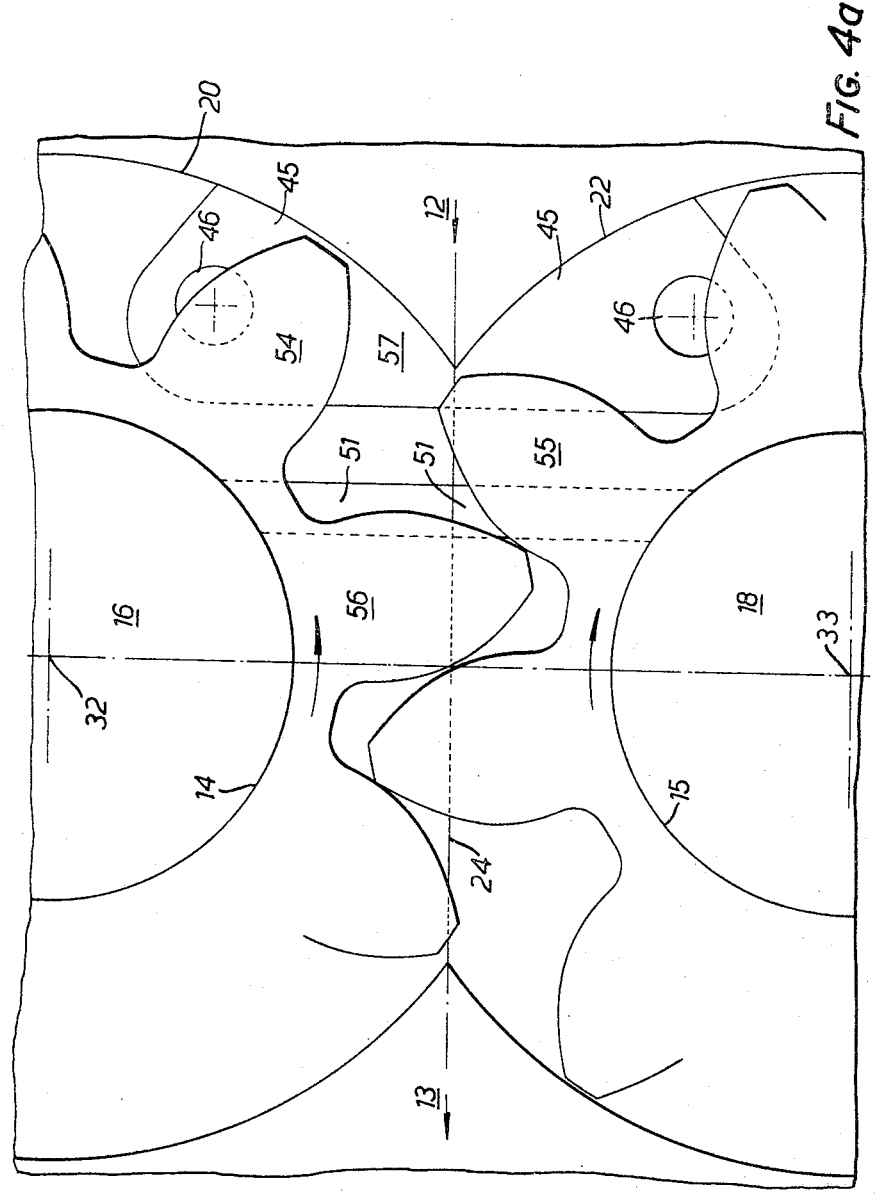

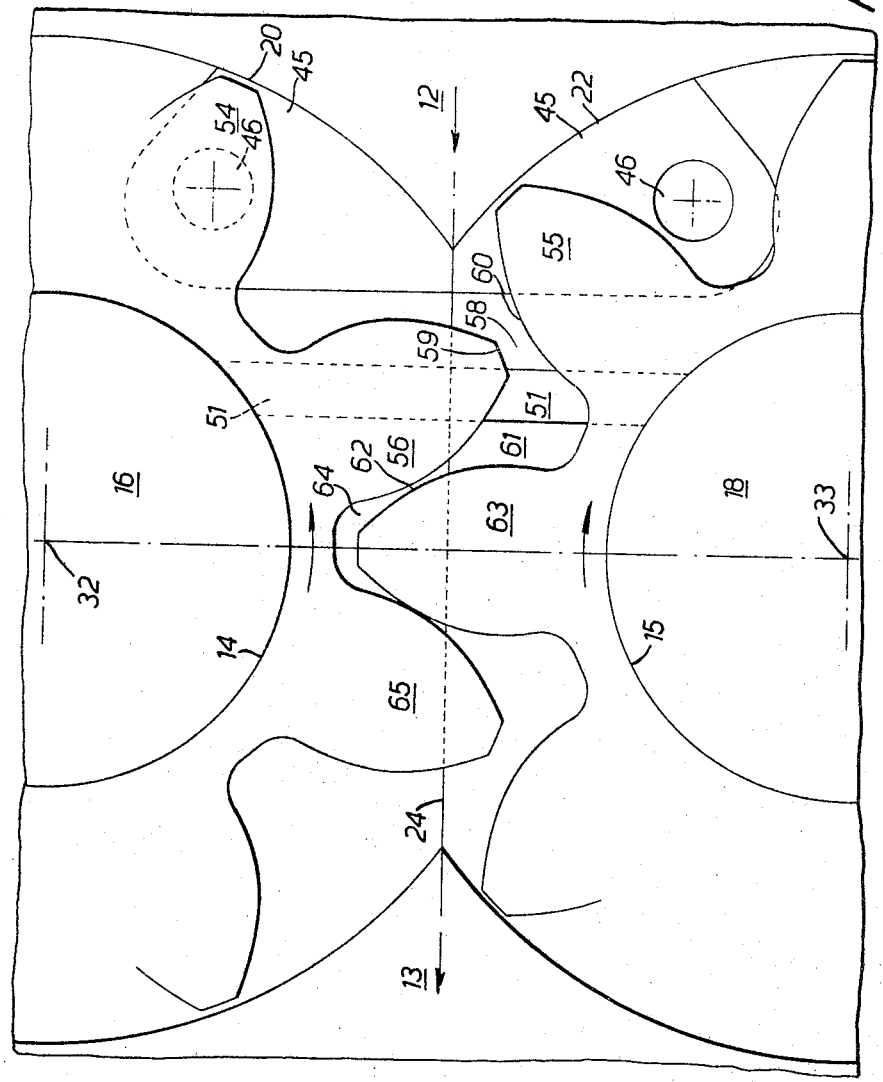

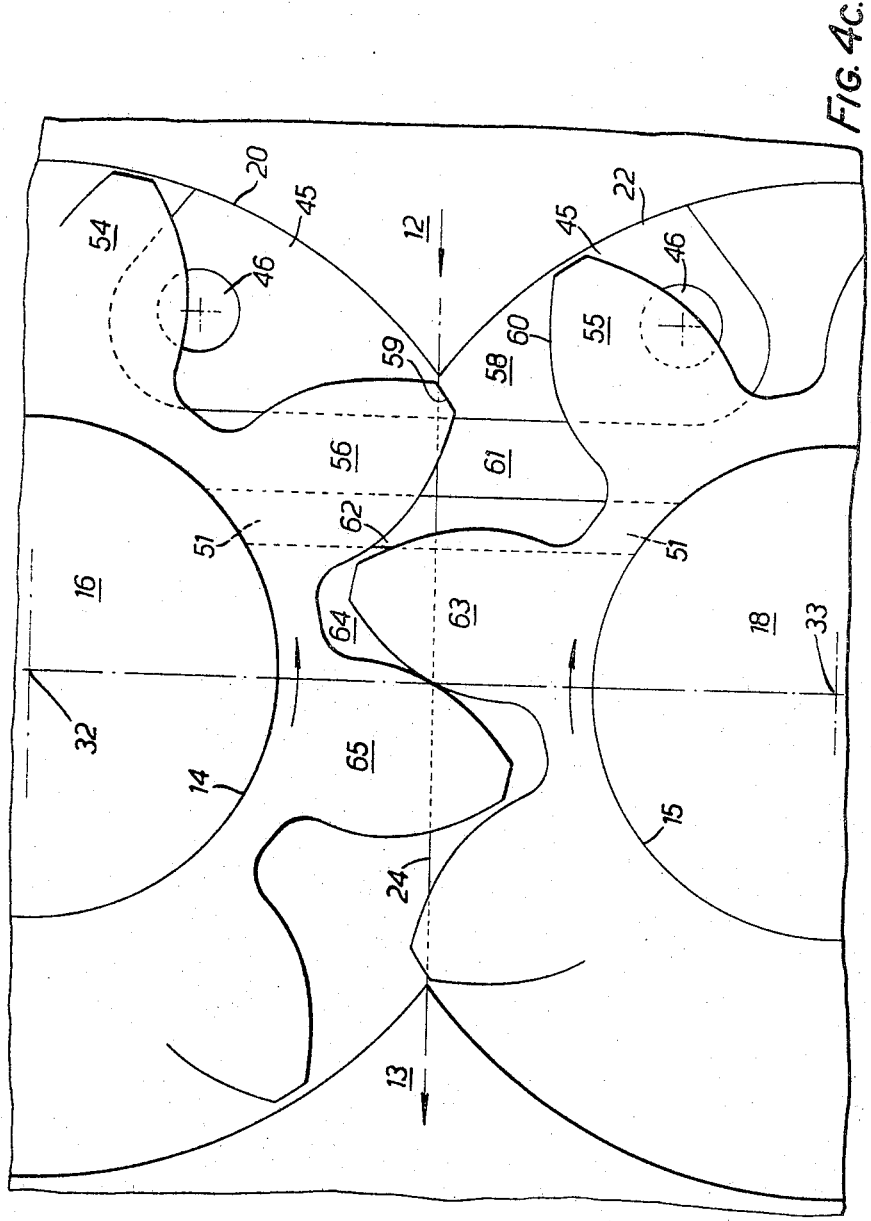

Jan. 20, 1970  P. G. JOYNER  3,490,382
GEARING AND LUBRICATING MEANS THEREFOR
Filed Aug. 9, 1968  5 Sheets-Sheet 5

INVENTOR
PHILIP GEORGE JOYNER
BY
Christensen, Sanborn & Matthews
ATTORNEYS

United States Patent Office 3,490,382
Patented Jan. 20, 1970

3,490,382
GEARING AND LUBRICATING MEANS THEREFOR
Philip G. Joyner, Brockworth, England, assignor to Dowty Hydraulic Units Limited, Cheltenham, England, a British company
Filed Aug. 9, 1968, Ser. No. 751,612
Claims priority, application Great Britain, Aug. 21, 1967, 38,474/67
Int. Cl. F04c 29/02; F16n 17/06; F16c 1/24
U.S. Cl. 103—126                    14 Claims

ABSTRACT OF THE DISCLOSURE

Gearing, including meshing toothed or lobed rotors having shafts supported for rotation in bushes, wherein shaft lubrication is afforded by a circulation of liquid from a source through a passageway in each bush and back along grooving in the bore of each bush to a zone on the end faces of the bushes adjacent the rotors where, in operation of the gearing, pairs of teeth or lobes successively are commencing to come out of mesh, the increasing volume of the spaces between them giving rise to this circulation.

---

This invention relates to gearing and lubricating means therefor.

SUMMARY OF THE INVENTION

According to this invention gearing includes at least two meshing rotors of toothed or lobed form having shafts supported for rotation in bushes, grooving in the bore of each bush extending from that end portion of the bush remote from the rotor to the other end portion thereof adjacent the rotor, a passageway in each bush extending from one to the other of said end portions, the end portions of the grooving and the passageway remote from the rotor being in communication with each other, the end portion of the passageway adjacent the rotor being in communication with a source of liquid, and the end portion of the grooving adjacent the rotor being in communication with a zone on the end faces of the bushes adjacent the rotors, where, in operation of the gearing, pairs of teeth or lobes successively are commencing to come out of mesh, the increasing volume of the spaces between them giving rise to a flow of liquid from said source along said passageway and grooving to said spaces for shaft lubrication.

A channel may be formed in the respective face of each bush in said zone with which said grooving is in communication.

A relief recess may be provided in each shaft immediately adjacent the respective rotor side face, by which said channel is placed in communication with said grooving.

The bushes may be of D-cross-sectional shape with their flat portions abutting, and in this case the channels of each pair of abutting bushes may be in alignment with each other in said zone.

The meshing rotors may be the rotary elements of a fluid pump having a low pressure inlet port and a high pressure outlet port. In this case each said passageway may extend from a respective recess directly open to the low pressure port and formed in said face adjacent the respective rotor, being spaced from said channel on the low pressure port side thereof.

Alternatively, the meshing rotors may be the rotary elements of a fluid motor having a high pressure inlet port and a low pressure outlet port. In this case each said passageway may extend from a respective recess directly open to the high pressure port and formed in said face adjacent the respective rotor, being spaced from said channel on the high pressure port side thereof.

Alternatively, again, the meshing rotors may be the gears of a gear train intended to be submerged in lubricant in a gear-box, each said passageway being in direct communication with that lubricant.

In the case of a fluid pump or motor, the bushes, or certain of the bushes, may be fluid-pressure balanced and/or loaded in a manner intended to reduce bush wear.

The end portions of each grooving and each passageway remote from the respective rotor may be both in communication with a respective chamber formed adjacent that end portion of the respective bush remote from the rotor and at least partly within casing structure. The end portion of each grooving remote from the respective rotor may open directly into said chamber, and the end portion of each passageway remote from the respective rotor may open into a recess in the face of the respective bush remote from the respective rotor, which recess itself opens substantially directly into said chamber.

BRIEF DESCRIPTION OF THE DRAWINGS

Of the four accompanying drawings.

DESCRIPTION OF THE PREFERRED EMBODIMENT

Figure 1:
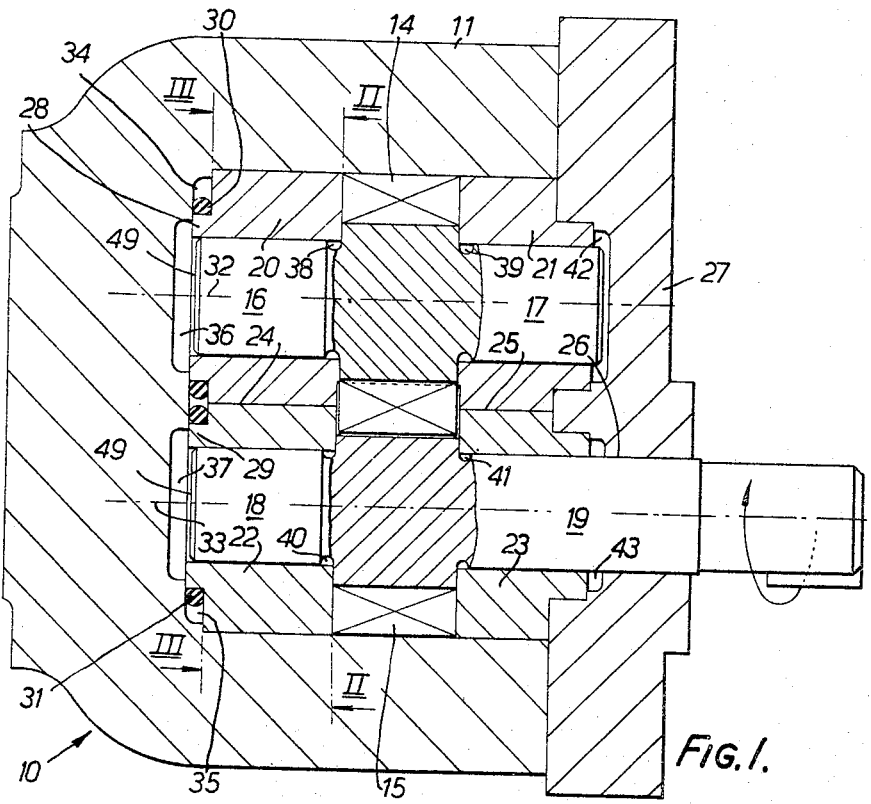
FIGURE 1 is a cross-section of a gear pump.
Figure 2:
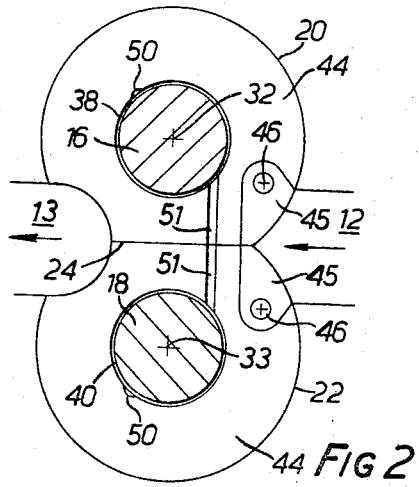
FIGURE 2 is a part-cross-section of the pump shown in FIGURE 1, taken along the line II—II thereon.

With reference to the drawings, a gear pump 10 includes a casing 11 having a low pressure or inlet port, not shown in FIGURE 1, but indicated diagrammatically in FIGURE 2 at 12. The casing also has a high pressure or outlet port, also not shown in FIGURE 1, but indicated diagrammatically at 13 in FIGURE 2. The casing 11 houses two meshing pump rotors in the form of gears 14 and 15, the shafts 16, 17; 18, 19 of which are mounted for rotation in respective pairs of bushes 20, 21; 22, 23. The bushes are D-shaped cross-section with the flats of adjacent bushes in abutment as at 24 and 25 respectively.

The shaft 19 passes through an aperture 26 in a pump closure member 27 which is bolted to the casing 11. Externally of the pump, the shaft 19 is connectible to a power source (not shown).

The portions of the bushes 20 and 22 remote from the gears 14 and 15 are provided with spigot-like projections 28 and 29 of predetermined shape, around each of which a sealing ring 30, 31 is provided as shown in FIGURE 1. The shape of these projections is clearly shown in FIGURE 3, but in that figure the sealing rings are omitted.

The areas of the bushes 20 and 22 outside of the sealing rings 30 and 31 are subjected to high pressure from the outlet port 13 of the pump which gains access thereto through suitable passage means (not shown).

The end face areas of the projections 28 and 29 confined within the sealing rings 30 and 31 are low pressure areas, the effective centres of pressure thereof being offset from the gear rotational axes 32 and 33 as necessary to provide, in known manner, such fluid-pressure-balancing of the bushes 20 and 22 as to oppose the tendency of the bushes to tilt in operation, thereby to reduce bush wear. The chambers in the casing 11 subjected to high pressure are shown in FIGURE 1 at 34 and 35, while the chambers subjected to low pressure are shown at 36 and 37.

As well as providing for fluid-pressure-balancing of the bushes 20 and 22, the assembly of gears 14 and 15 and bushes 20, 21, 22 and 23 is pressure-loaded by this arrangement to provide adequate sealing at the inter-faces of the gears and bushes.

As shown in FIGURE 1, the gear shafts are provided each with undercuts or relief recesses, 38, 39, 40 and 41 immediately adjacent the side faces of the respective gears.

Chambers 42 and 43 are provided in the closure member 27 at the end portions of the bushes 21 and 23 remote from gears 14 and 15. Like the chambers 36 and 37, the chambers 42 and 43 are subjected to low pressure.

In order to lubricate the shafts of the gears when running in the bushes, a low pressure lubrication system is provided in the manner hereinafter described, but although reference is made to the bushes 20 and 22, a similar lubrication system is provided for the bushes 21 and 23 of the gear pump.

Figure 3:
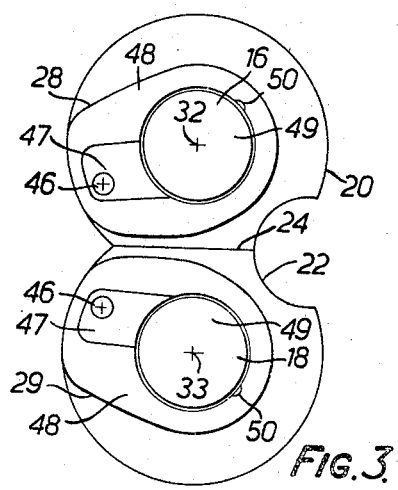
FIGURE 3 is a part-cross-section of the pump shown in FIGURE 1, taken along the line III—III thereon.

On the face 44 of each bush 20, 22 adjacent its gear and immediately adjacent the inlet port 12 there is provided a recess 45, which opens at the circumferential edge of the bush directly and unobstructively to the inlet port 12, and from which a respective passageway 46 is drilled, as shown in FIGURES 2 and 3, completely through the bush and parallel with the axes 32 and 33. At its end portion remote from the respective gear, each passageway opens into a recess 47 formed in the face 48 of the respective projection 28, 29. The recess 47 opens inwardly of its bush into a respective space 49 of only small axial length formed at the extremity of the respective shaft 16/18, each such space opening into the respective chamber 36/37.

Approximately diametrically opposite the recess 47, the bore of each bush 20/22 is provided with grooving, in this embodiment an axially-directed groove 50. This groove is positioned just beyond the region of high loading of the respective shaft 16/18 in its bush. Each groove 50 opens from the face 48 of the respective projection 28, 29 and runs for the full axial length of its bush, leading to the face 44 of the bush adjacent its gear, so that it is in direct open communication with the respective relief recess 38/40 shown in FIGURE 1. However, since the pressure-balancing means and pressure-loaded means hold the faces 44 in sealing engagement with respective side faces of the gears, this end portion of each groove 50 is sealed from the respective side face so that the flow can only occur into the respective relief recess 38/40.

As shown in FIGURE 2 of the drawings, the face 44 of the bush 20/22 is provided with a channel in the form of a shallow slot 51 which aligns with a similar slot in the mating bush 22. Each slot opens into its respective relief recess 38, 40, and is positioned on the inlet port side of a plane containing the two axes 32 and 33. This position is such that the gear teeth of the two gears commence to pass the slot 51 of each respective bush as they separate on leaving the condition of mesh, in a manner such as to induce a flow of liquid for lubrication of the gear shafts, as hereinafter described.

There is a predetermined back-lash between the teeth of the driving gear 15 and those of the driven gear 14.

In operation of the pump, with rotation of the driving shaft 19, the two intermeshing gears 14 and 15 rotate, drawing oil through the inlet port 12 and discharging this under pressure through the outlet port 13, a suitable relief valve (not shown) being provided in association with the outlet port.

As will be seen from FIGURES 4a, b, c and d, with the meshing gears rotating in the direction of the arrows, the inter-tooth spaces momentarily decrease in volume as the meshing teeth approach the plane containing the two axes 32 and 33, but as these teeth move beyond this plane, the inter-tooth spaces commence to increase in volume. Since, as these teeth commence to pass the slots 51 they are starting to separate, liquid present in the inlet port 12 is finding its way into those inter-tooth spaces which are increasing in volume. However, the access of such liquid to these spaces is restricted because the separating teeth form a throttle to the flow and thus, partly dependent on this and on the fact that the inter-tooth spaces of the unmeshing teeth are increasing in volume, a pressure drop is created so that a pressure differential exists between the liquid present in the inlet port 12 (and the recesses 45) and in the slots 51.

The overall result is the inducement of a flow of lubricating liquid through the respective bushes 20 and 22. The higher pressure of liquid in the recesses 45 and the lower pressure in the slots 51 cause a proportion of the inlet liquid which would otherwise be carried around circumferentially by the gears, to pass directly from the inlet port into the recesses 45 and down through the passageways 46 into the recesses 47, then through the spaces 49, the chambers 36 and 37, the grooves 50 and the relief recesses 38/40, into the slots 51.

Figure 4D:
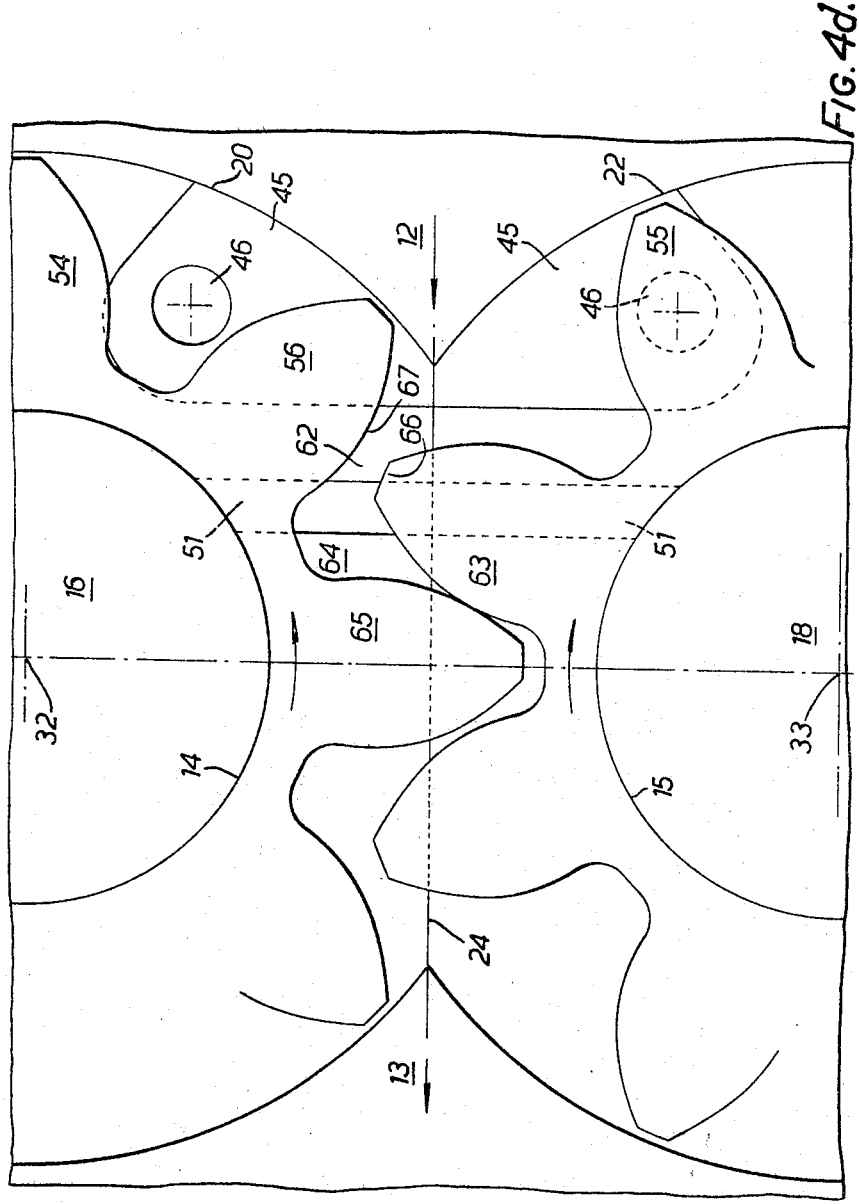
FIGURE 4 shows at a, b, c and d, four meshing conditions of the gears of the pump shown in FIGURE 1.

To particularize on the exact meshing conditions of the intermeshing gears 14 and 15, reference is specifically made to FIGURES 4a to 4d. In FIGURE 4a the teeth 55 and 56 are just about to separate as they approach the slots 51. Already, the relationship between the tooth 54 and the tooth 55 is such that these form some restriction to inlet liquid passing into the residual inter-tooth space 57 and thus into the slots 51.

As shown in FIGURE 4b, the teeth 55 and 56 are now separated, the tooth 55 having almost completely passed into slot 51, while the tooth 56 is passing its slot 51. The clearance 58 between the tip 59 of the tooth 56 and the left-hand flank 60 of the tooth 55 forms a restriction to the flow of inlet liquid into the inter-tooth space 61, and thus depending on this, and on the increasing volume of space 61, there is an appreciable pressure drop between liquid in the inlet port 12 and liquid in the space 61 and in the slots 51.

It is this pressure drop which induces the lubricating circuit through both bushes 20 and 22.

Back-lash, as at 62, between the teeth 56 and 63 places the inter-tooth space 61 in communication with the space 64 between the teeth 56/63/65.

As shown in FIGURE 4c, the tooth 56 has moved further past its slot 51 and the tooth 63 is just commencing to move away from the tooth 56. However, the clearance 58 has enlarged, so that the inducement for lubrication has lessened as far as the restriction formed by that clearance is concerned. At this point, however, the inter-tooth space 64 is opening to the respective slot 51, and as shown in FIGURE 4d, the back-lash 62 has increased to a substantial clearance between the tip 66 of the tooth 63 and the left-hand flank 67 in the drawing of the tooth 56, this clearance forming the succeeding restriction.

Thus, required pressure differential conditions are maintained as successive gear teeth come out of mesh, so that the lubricating flow through the bushes is substantially continuous.

Hence, the lubricating circuit above-described is entirely on the low pressure side of the gear pump, and an adequate low pressure circulation of liquid for lubrication of the shaft bushes is obtained. Since it is not necessary to tap high pressure liquid for lubrication purposes from the delivery port, greater pump efficiency is achieved. Further, cool oil is to advantage used, as opposed to hot oil in the case of tapping from the pump delivery port.

Although in the above-described embodiment the invention is applied to a gear pump, in an alternative embodiment the invention is applied to a gear motor. In this case the construction of the displacement machine is very similar to that of the gear pump and physically the recesses, channels, grooving and passageways are in the same position, but the ingoing liquid is at high pressure. However the lubrication arrangements for the shafts function in a manner similar to that of the gear pump.

In another embodiment, the invention is applied for the lubrication of the shafts of gears in a gear train, these gears being submerged in lubricant contained in a gear-box. Here the recesses, channels, grooving and passageways are arranged in a manner similar to those of the gear pump above-described, with the passageways in direct communication with that lubricant, and the lubricant in the gear-box is drawn around through a similar lubrication circuit, operating on a similar principle to the circuit of the above-described gear pump.

The invention is no way limited to rotors of toothed form, as in other embodiments the rotors may be of meshing lobed form.

Further, the invention is in no way limited to axially-directed grooving in the bush bores, as in other embodiments other forms of grooving, for example helical grooving, may with advantage be provided.

Again the invention is not limited to the provision of relief recesses in the shafts adjacent the rotor side faces, as in other embodiments a counter-bore of adequate dimension is provided in each of the bushes adjacent the rotor side faces, either alternatively to the recesses in the shafts, or additionally thereto, for the same purpose.

Again, although in the first above-described embodiment the bushes are of abutting D-shape, in alternative embodiments they may not be D-shaped nor abut, or again the bushes on at least one side of the gears may be arranged in a common end plate.

Further, the invention is in no way limited in its application to two meshing gears or to gears having shafts extending from both sides thereof, as in other embodiments any number of meshing gears may be provided and any gear may have its shaft extending from one side only.

I claim:

1. Gearing including at least two meshing rotors of toothed or lobed form having shafts supported for rotation in bushes, grooving in the bore of each bush extending from that end portion of the bush remote from the rotor to the other end portion thereof adjacent the rotor, a passageway in each bush extending from one to the other of said end portions, the end portions of the grooving and the passageway remote from the rotor being in communication with each other, the end portion of the passageway adjacent the rotor being in communication with a source of liquid, and the end portion of the grooving adjacent the rotor being in communication with a zone on the end faces of the bushes adjacent the rotors where, in operation of the gearing, pairs of teeth or lobes successively are commencing to come out of mesh, the increasing volume of the spaces between them giving rise to a flow of liquid from said source along said passageway and grooving to said spaces, for shaft lubrication.

2. Gearing as claimed in claim 1, wherein a channel is formed in the respective face of each bush in said zone with which said grooving is in communication.

3. Gearing as claimed in claim 2, wherein a relief recess is provided in each shaft immediately adjacent the respective rotor side face, by which said channel is placed in communication with said grooving.

4. Gearing as claimed in claim 1, wherein the bushes are of D-cross-sectional shape with their flat portions abutting.

5. Gearing as claimed in claim 4, wherein the channels of each pair of abutting bushes are in alignment with each other in said zone.

6. Gearing as claimed in claim 1, wherein the meshing rotors are the rotary elements of a fluid pump having a low pressure inlet port and a high pressure outlet port.

7. Gearing as claimed in claim 6, wherein each said passageway extends from a respective recess directly open to the low pressure port and formed in said face adjacent the respective rotor, being spaced from said channel on the low pressure port side thereof.

8. Gearing as claimed in claim 1, wherein the meshing rotors are the rotary elements of a fluid motor having a high pressure inlet port and a low pressure outlet port.

9. Gearing as claimed in claim 8, wherein each said passageway extends from a respective recess directly open to the high pressure port and formed in said face adjacent the respective rotor, being spaced from said channel on the high pressure port side thereof.

10. Gearing as claimed in claim 1, wherein the meshing rotors are the gears of a gear train intended to be submerged in lubrication in a gear-box, each said passageway being in direct communcation with that lubricant.

11. Gearing as claimed in claim 6, wherein certain at least of the bushes are fluid-pressure balanced in a manner intended to reduce bush wear.

12. Gearing as claimed in claim 8, wherein certain at least of the bushes are fluid-pressure balanced in a manner intended to reduce bush wear.

13. Gearing as claimed in claim 1, wherein the end portions of each grooving and each passageway remote from the respective rotor are both in communication with a respective chamber formed adjacent that end portion of the respective bush remote from the rotor and at least partly within casing structure.

14. Gearing as claimed in claim 13, wherein the end portion of each grooving remote from the respective rotor opens directly into said chamber, and the end portion of each passageway remote from the respective rotor opens into a recess in the face of the respective bush remote from the respective rotor, which recess itself opens substantially directly into said chamber.

References Cited

UNITED STATES PATENTS

| | | |
|---|---|---|
| 1,372,576 | 3/1921 | Tullmann. |
| 2,276,107 | 3/1942 | Simons. |
| 2,756,684 | 7/1956 | Renzo. |
| 2,775,209 | 12/1956 | Albright. |
| 2,910,142 | 10/1959 | Almen. |
| 2,986,096 | 5/1961 | Booth et al. |

FOREIGN PATENTS 322,778  12/1929  Great Britain.

DONLEY J. STOCKING, Primary Examiner

WILBUR J. GOODLIN, Assistant Examiner

U.S. Cl. X.R.

184—6; 230—207; 308—122